US010162574B2

(12) United States Patent
Matsumura

(10) Patent No.: US 10,162,574 B2
(45) Date of Patent: Dec. 25, 2018

(54) STORAGE CONTROL DEVICE UTILIZING A REASSEMBLY OF FIRST ACCESS INSTRUCTIONS BASED ON SECOND ACCESS INSTRUCTIONS

(71) Applicants: BIOS CORPORATION, Shibuya-ku (JP); MELCO HOLDINGS INC., Nagoya-shi (JP)

(72) Inventor: Seimei Matsumura, Shibuya-ku (JP)

(73) Assignees: BIOS Corporation, Shibuya-ku (JP); MELCO HOLDINGS INC., Nagoya-shi (JP)

( * ) Notice: Subject to any disclaimer, the term of this patent is extended or adjusted under 35 U.S.C. 154(b) by 221 days.

(21) Appl. No.: 15/200,263

(22) Filed: Jul. 1, 2016

(65) Prior Publication Data

US 2017/0003898 A1    Jan. 5, 2017

(30) Foreign Application Priority Data

Jul. 2, 2015  (JP) ................................ 2015-133980

(51) Int. Cl.
| | |
|---|---|
| G06F 12/00 | (2006.01) |
| G06F 13/00 | (2006.01) |
| G06F 13/28 | (2006.01) |
| G06F 3/06  | (2006.01) |

(52) U.S. Cl.
CPC ............ *G06F 3/0689* (2013.01); *G06F 3/061* (2013.01); *G06F 3/0659* (2013.01)

(58) Field of Classification Search
CPC ....... G06F 3/0689; G06F 3/061; G06F 3/0659
USPC .................................................. 711/114, 157
See application file for complete search history.

(56) References Cited

U.S. PATENT DOCUMENTS

| | | | |
|---|---|---|---|
| 2006/0020749 A1* | 1/2006 | Waldvogel | ............. G06F 3/061 711/112 |
| 2011/0222388 A1* | 9/2011 | Park | ...................... G06F 3/0613 369/100 |
| 2014/0351509 A1 | 11/2014 | Chiu et al. | |

* cited by examiner

*Primary Examiner* — Shane Woolwine
(74) *Attorney, Agent, or Firm* — Oblon, McClelland, Maier & Neustadt, L.L.P.

(57) ABSTRACT

A storage control device that includes processing circuitry that receives second access instructions of a plurality of series generated based on a first access instruction for instructing writing of data in a first storage or reading of data from the first storage, through a plurality of channels, the storage control device being connected to a controller configured to perform writing of data in the first storage or reading of data from the first storage according to an instruction for accessing the first storage, reassembles the first access instruction based on the second access instructions of the plurality of series received by the processing circuitry, and outputs the first access instruction reassembled by the processing circuitry to the controller.

16 Claims, 6 Drawing Sheets

STORAGE CONTROL DEVICE UTILIZING A REASSEMBLY OF FIRST ACCESS INSTRUCTIONS BASED ON SECOND ACCESS INSTRUCTIONS

CROSS-REFERENCE TO RELATED APPLICATION

This application claims priority from Japanese Patent Application No. 2015-133980, filed on Jul. 2, 2015, the entire subject matter of which is incorporated herein by reference.

FIELD

Aspects of the present disclosure relate to a storage control device for storing data.

BACKGROUND

US2014/0351509A discloses a system capable of taking advantage of the operation speed of a relatively high-speed interface to the outside while internally using a relatively low-speed interface. Specifically, the system is connected to a host through a Universal Serial Bus (USB) 3.1 interface which is a relatively high-speed interface. In the system, RAID 0 is configured by a plurality of Solid State Drives (SSDs) which are connected with one another through a plurality of relatively low-speed serial ATAs (SATAs), and data which the host has requested the system to store is divided into blocks and is written in two independent SSDs by performing a striping process.

In the above-described system, in some cases such as a case of configuring SSDs in RAID 5 or 6 in order to secure redundancy, when it is intended to further extend the system, storages configured in RAID 5 or 6 are required, instead of SSDs, and therefore, the system scale excessively increases. That is, in the related-art system, when it is intended to extend the system in order to secure redundancy, the system scale would excessively increase.

SUMMARY

According to an embodiment of the present disclosure, there is provided a storage control device that includes processing circuitry configured to receive second access instructions of a plurality of series generated based on a first access instruction for instructing writing of data in a first storage or reading of data from the first storage, through a plurality of channels, the storage control device being connected to a controller configured to perform writing of data in the first storage or reading of data from the first storage according to an instruction for accessing the first storage, reassemble the first access instruction based on the second access instructions of the plurality of series received by the processing circuitry, and output the first access instruction reassembled by the processing circuitry to the controller.

BRIEF DESCRIPTION OF THE DRAWINGS

The above and other aspects of the present disclosure will become more apparent and more readily appreciated from the following description of embodiments of the present disclosure taken in conjunction with the attached drawings, in which.

DETAILED DESCRIPTION

An embodiment of the present disclosure provides a storage control device capable of suppressing an increase in the system scale at system extension while maintaining operation speed.

According to the embodiment of the present disclosure, it is possible to suppress an increase in the system scale while maintaining the operation speed.

Figure 1:
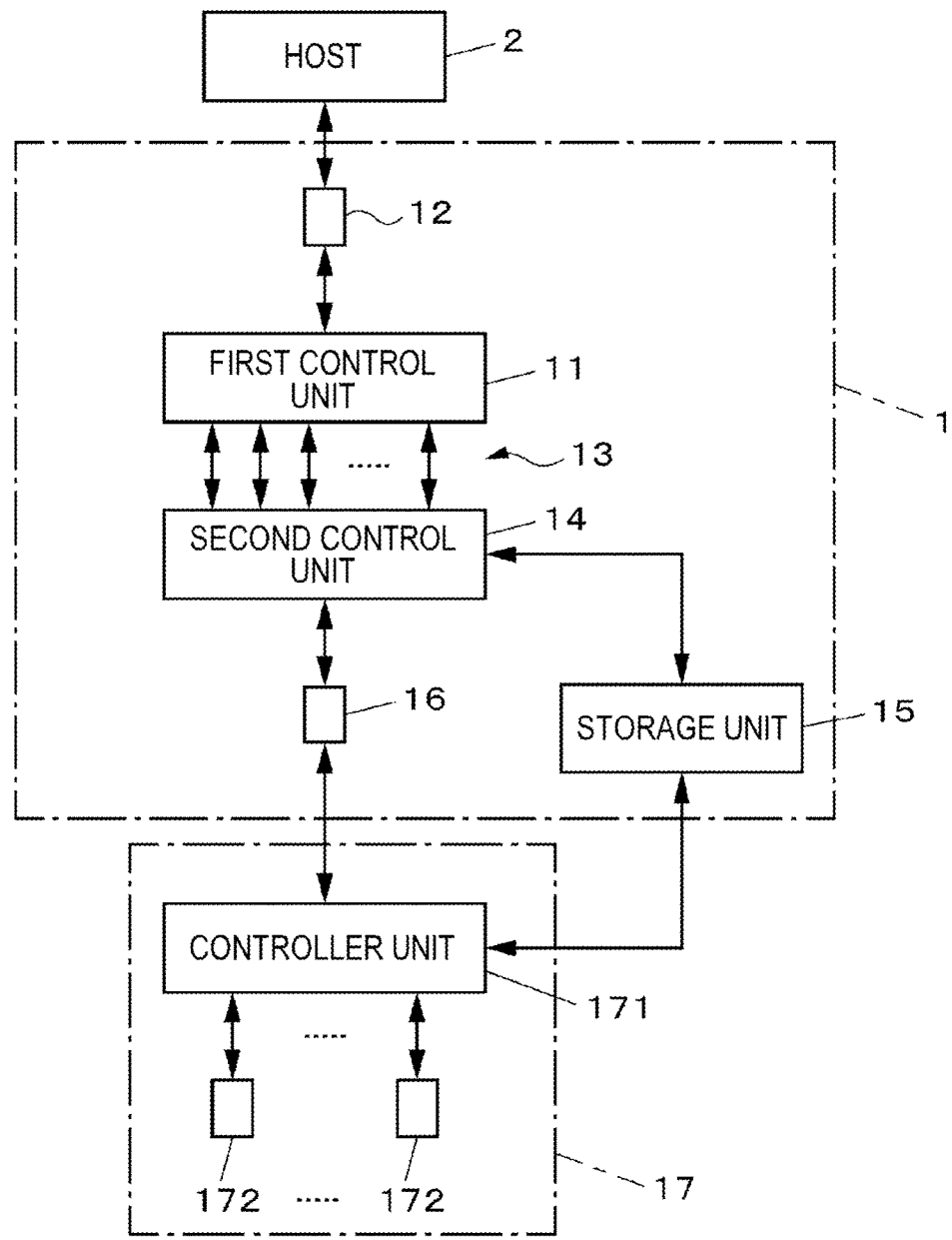
FIG. 1 is a block diagram illustrating a configuration example of a storage control device according to an embodiment of the present disclosure.

An embodiment of the disclosure will be described with reference to the accompanying drawings. As shown in FIG. 1, a storage control device 1 according to an embodiment of the present disclosure is used while being connected to a host 2 and includes a first control unit 11, a first interface unit 12, a second interface unit 13, a second control unit 14, a storage unit 15, a third interface unit 16, and a storage system 17.

The first control unit 11 is a program control device such as a micro processor, and has a memory device retaining programs, and operates according to the programs retained in the memory device. If receiving a command and data from the host 2 through the first interface unit 12, the first control unit 11 outputs the command and the data through the second interface unit 13. Also, if receiving data through the second interface unit 13, the first control unit 11 transmits the data to the host 2 through the first interface unit 12. The detailed operations of the first control unit 11 will be described below.

The first interface unit 12 is an interface for connecting the host 2 and the storage control device 1, and is, specifically, a Universal Serial Bus (USB) 3.1 interface or the like. The second interface unit 13 has a plurality of interfaces (channels), and the individual channels are used in exchange of commands and data between the first control unit 11 and the second control unit 14. Specifically, the individual channels of the second interface unit 13 are connection mechanisms relatively slower than the first interface unit 12, and the channels are interfaces of Serial ATA (SATA) 3 or the like. In other words, in the present embodiment, the maximum rate of data transmission which is performed through the USB 3.1 interface is 10 Gbps. As the channels of the second interface unit 13, an SATA 3 interface having a transmission rate lower than that of the USB 3.1 interface is used.

Now, operations of the first control unit 11 will be described. If receiving a command and data (a first access instruction) through the relatively high-speed first interface unit 12, the first control unit 11 divides the command and the data and outputs the divided command and data to N-number of channels (wherein "N" is an integer of 2 or greater) of the relatively low-speed second interface unit 13.

Specifically, if receiving a command and data (an access instruction) in series from the host 2, the first control unit 11 divides the command and the data, and outputs the divided command and data as access instructions (second access instructions) of a plurality of series, to the N-number of channels (wherein "N" is an integer of 2 or greater) of the second interface unit 13, by operating as a RAID 0 (so-called striping) controller.

For example, in a case where N is 2, that is, the second interface unit 13 has Channel 0 (CH0) and Channel 1 (CH1), the first control unit 11 operates as follows.

In the following description, it is assumed that the first control unit 11 has received a command representing that data should be written in Block 0 to Block 15 of the logical volume of RAID 0, and data (data of 64 KB) to be written by that command, from the host 2. In this case, the first control unit 11 divides the data in units of a block size (for example, 4 KB), thereby obtaining data blocks. In the present embodiment, since data of 64 KB is divided in units of 4 KB, 16 data blocks are obtained.

The first control unit 11 arrange the obtained sixteen data blocks (referred to as BLK0 to BLK15) in two series, thereby obtaining a first series (32 KB) including data blocks BLK0, BLK2, BLK4, ..., and BLK14, and a second series including data blocks BLK1, BLK3, ..., and BLK15. Thereafter, the first control unit 11 generates an instruction of the first series (which includes the LBA of the head of an area of 32 KB, and a command for writing the data in the corresponding area) for writing the data blocks of the first series in the logical volume, and an instruction of the second series (which includes the LBA of the head of an area of 32 KB, and a command for writing the data in the corresponding area) for writing the data blocks of the second series in the logical volume.

Further, the first control unit 11 determines a channel to be first used to output the data blocks, based on the remainder after division of the LBA (HLBA: Host Logical Block Address) input from the host by the number of segments. In the above-described example, based on whether the quotient obtained by dividing the HLBA by "8" is an odd number or an even number (whether the remainder obtained by dividing the HLBA by 16 is 0 or not), the first control unit 11 determines a channel to be first used to output the data blocks. Specifically, in the following example, when the quotient obtained by dividing the HLBA by "8" is an even number, the first control unit 11 determines Channel 0 (CH0) as a channel to be first used to output the data blocks; whereas when the quotient obtained by dividing the HLBA by "8" is an odd number, the first control unit 11 determines Channel 1 (CH1) as a channel to be first used to output the data blocks.

The first control unit 11 sequentially outputs the instruction of the first series and the first data block (the data block BLK0 which should be written in Block 0) of the data blocks of the first series through the channel (in the following example, CH0) determined in the above-described manner.

Further, the first control unit 11 sequentially outputs the instruction of the second series and the first data block (the data block BLK1 which should be written in Block 1) of the data blocks of the second series through the next channel (at this moment, since the first control unit 11 outputs the data block of the first series through CH0, the next channel becomes CH1). Thereafter, the first control unit 11 sequentially outputs the data blocks BLK2, BLK3, ..., and BLK15 while alternately using CH0 and CH1.

In this way, the data blocks BLK0, BLK2, BLK4, ..., and BLK14 of the first series which should be stored in Blocks 0, 2, 4, ..., 14, and the instruction of the first series representing that those data blocks should be written are output through CH0 of the second interface unit 13, and the data blocks BLK1, BLK3, ..., and BLK15 of the second series which should be stored in Blocks 1, 3, 5, ..., 15, and the instruction of the second series representing that those data blocks should be written are output through CH1 of the second interface unit 13

Meanwhile, if receiving a command representing that data designated by an LBA of the logical volume of RAID 0 and a LBN should be read from the host 2, the first control unit 11 divides the command received from the host 2, and outputs the divided command, as access instructions of a plurality of series, to the N-number of channels (wherein "N" is an integer of 2 or greater) of the second interface unit 13. Here, each of the instructions of the plurality of series is output as one instruction with respect to the plurality of data blocks of the corresponding series, not with respect to each data block.

For example, in a case where N is 2, that is, the second interface unit 13 has Channel 0 (CH0) and Channel 1 (CH1) similarly in the above-described example, if receiving a read command, the first control unit 11 operates as follows.

For the following description, it is assumed that the first control unit 11 has received a command representing that data stored in Block 0 to Block 15 (each of which is 4 KB) of the logical volume of RAID 0 should be read from the host 2.

Since the first control unit 11 has performed the process of striping, arranging, and writing the sixteen data blocks (BLK0 to BLK15) in two series, the first control unit generates instructions each of which includes the LBA of the head of corresponding data blocks and represents that data should be read from an area of 32 KB from the LBA, through the channels, respectively.

In this way, the instruction of the first series representing that the data blocks BLK0, BLK2, BLK4, ..., and BLK14 should be read from Blocks 0, 2, 4, ..., 14 is output through CH0 of the second interface unit 13, and the instruction of the second series representing that the data blocks BLK1, BLK3, and BLK15 should be read from Blocks 1, 3, 5, ..., 15 is output through CH1 of the second interface unit 13.

Thereafter, if receiving the data of Blocks (the data blocks) through CH0 and CH1 of the second interface unit 13, the first control unit 11 arranges the data in succession, in an order (in this example, alternately), and then outputs the data to the host 2.

This processing of the first control unit 11 is the same as processing known as processing of a RAID 0 controller, and thus a more detailed description thereof will be omitted.

Also, if receiving a request for finishing processing related to each channel, the first control unit 11 finishes processing related to the corresponding channel.

Now, the second control unit 14 will be described. The second control unit 14 is a program control device such as a micro computer, and has a memory device retaining programs, and operates according to the programs retained in the memory device. The second control unit 14 receives the access instructions of the plurality of series through the channels of the second interface unit 13, respectively. Based on the plurality of series of access instructions, the second control unit 14 reassembles the instruction for accessing the logical volume, and outputs the reassembled access instruction through the third interface unit 16. This reassembling process will be described below in detail.

Also, if receiving a data block read from the logical volume, the second control unit 14 outputs the received data block through a channel having received a read command related to the received data block.

The storage unit 15 functions as a cash for retaining reassembled data or read data, and reading of data from the storage unit or writing of data in the storage unit is performed by the second control unit 14 and the storage system 17. The third interface unit 16 is connected to the second control unit 14 and the storage system 17, and transmits commands output from the second control unit 14, to the storage system 17.

In an example of the present embodiment, the storage unit 15 has a First In First Out (FIFP) memory, a multiplexer, ad a main memory. If data blocks are sequentially input to the storage unit, the data blocks are stored in the FIFO memory. Then, the data blocks are sequentially read from the FIFO memory, and the multiplexer selects an area in the main memory as the storage destination of each of the read data blocks, and stores the corresponding data block in the selected storage destination in the main memory.

The storage system 17 includes a controller unit 171, and disk drives 172 which serve storages. The controller unit 171 is, for example, a RAID controller. In response to a command received through the third interface unit 16, the controller unit 171 reads data from the storage unit 15 and writes the read data in the disk drives 172 which form RAID, or reads data from the disk drives 172 and stores the read data in the storage unit 15.

The disk drives 172 are SSDs, hard disk drives (HDDs), or the like, and form RAID.

The host 2 is, for example, a personal computer (PC) which functions as a host of the storage control device 1, and is connected to the storage control device 1 through the first interface unit 12, and transmits a data write command and data which should be written by the corresponding command. Also, the host 2 transmits a data read command to the storage control device 1 through the first interface unit 12, and receives data read from the storage control device 1, through the first interface unit 12.

Figure 2:
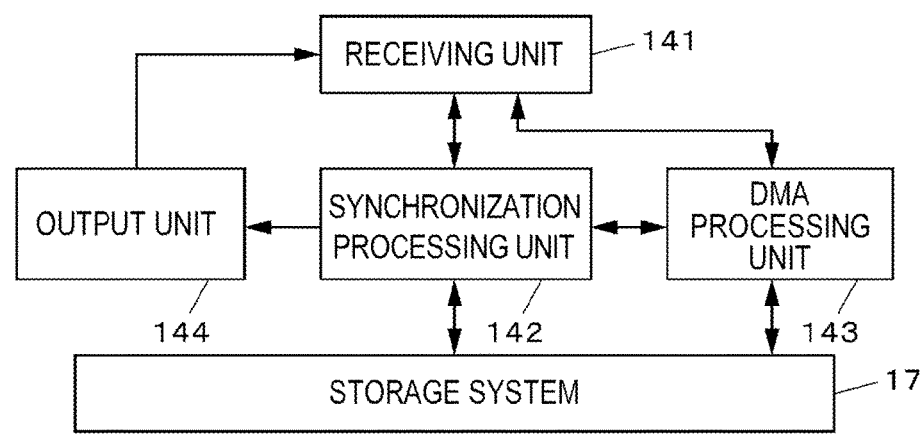
FIG. 2 is a functional block diagram illustrating an example of a second control unit of the storage control device according to the embodiment of the present disclosure.

Now, operations of the second control unit 14 will be described. As shown in FIG. 2, the second control unit 14 functionally includes a receiving unit 141, a synchronization processing unit 142, and an output unit 144. The second control unit 14 implements those functional components by executing a program stored in a memory (not shown). In the present embodiment, the program runs as a single process (even under a multi-task type operating system, the program runs as a single process without occurrence of switching of process contexts during processing).

Figure 3:
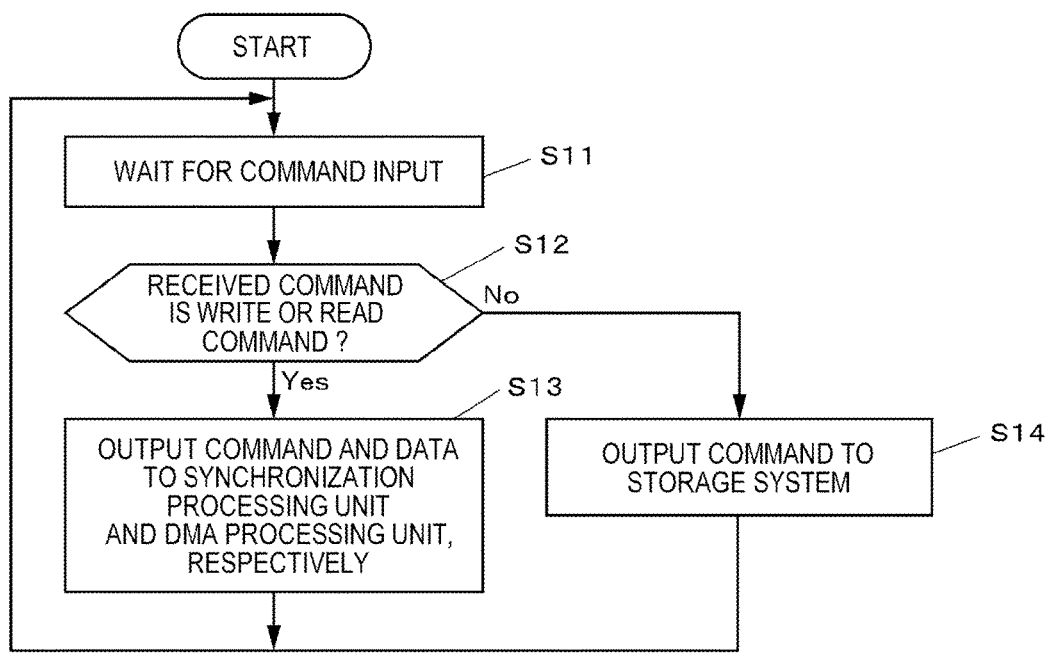
FIG. 3 is a flow chart illustrating an example of an access instruction receiving operation of the storage control device according to the embodiment of the present disclosure.

The receiving unit 141 receives commands (access instructions of N-number of series) divided for the N-number of channels of the second interface unit 13, through the N-number of channels, respectively, and outputs the commands to the synchronization processing unit 142, and outputs data blocks to the storage unit 15. Specifically, as illustrated in FIG. 3, in STEP S11, the receiving unit 141 waits for a command to be input from any one channel of the second interface unit 13. If a command is input, in STEP S12, the receiving unit 141 determines whether the received command is a data write command or data read command.

In a case of determining that the received command is a data write command or data read command ("Yes" in STEP S12), in STEP S13, the receiving unit 141 outputs the received command to the synchronization processing unit 142, and outputs data blocks received through the individual channels of the second interface unit 13, to a Direct Memory Access (DMA) processing unit 143. Then, the receiving unit returns to STEP S11.

Meanwhile, in a case of determining that the command input in STEP S11 is not a data write command or data read command ("No" in STEP S12), the receiving unit 141 outputs the received command, as it is, to the storage system 17, in STEP S14, and returns to STEP S11.

Figure 4:
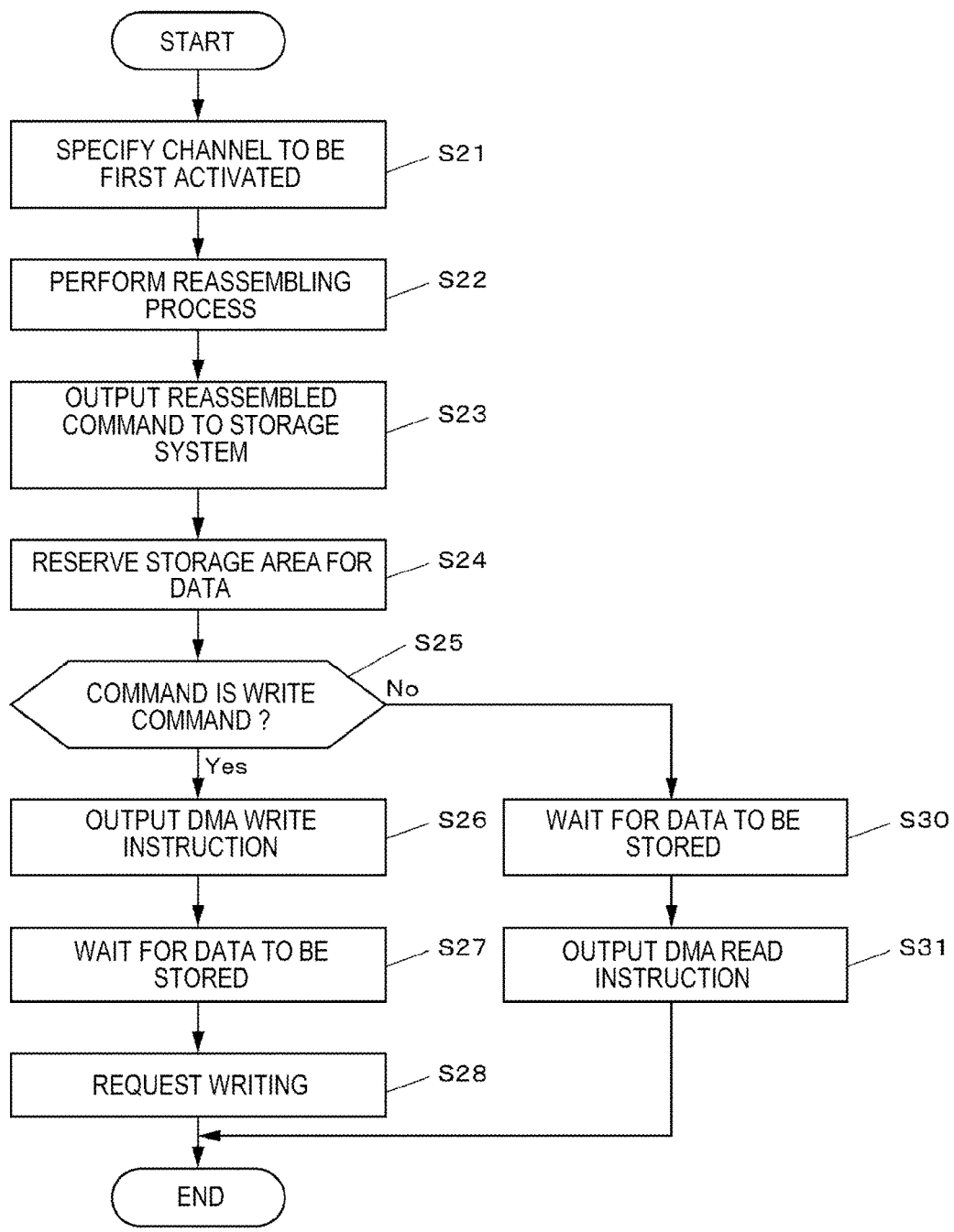
FIG. 4 is a flow chart illustrating an example of access instruction reassembling and access processing of the storage control device according to the embodiment of the present disclosure.

If the synchronization processing unit 142 receives the command from the receiving unit 141, it starts processing shown in FIG. 4, and reassembles a single command for the logical volume. In the present embodiment, a data read/write command which is input to each channel includes the address (logical bock address (LBA)) of the write destination of data or the read source of data, together with the size (logical block number (LBN)) of the data to be written or read.

In STEP S21, the synchronization processing unit 142 specifies a channel which is first activated (a channel which first receives a command) Specifically, in this process, the synchronization processing unit resets N-number of flags Flg0 to FlgN−1 each representing whether a corresponding channel is active, to "0". Thereafter, in the order from Channel 0 to Channel (N−1), in a case where Flgi (wherein "i" is a number specifying Channel i which is examined) is "0", the synchronization processing unit examines whether Channel i is active or not. If Channel i is active, the synchronization processing unit 142 performs a process of acquiring an LBA and a LBN of a command which is being input through Channel i and setting the flag Flgi to "1". Thereafter, once again, in the order from Channel 0 to Channel (N−1), in a case where Flgi (wherein "i" is a number specifying Channel i which is examined) is "0", the synchronization processing unit 142 examines whether Channel i is active. If Channel i is active, the synchronization processing unit 142 performs a process of acquiring an LBA and a LBN of a command which is being input through Channel i and setting the flag Flgi to "1". Hereinafter, a channel which is active will be referred to as an active channel.

Commands divided for a plurality of series by the first interface unit 12 are sequentially issued. Therefore, in issuing the commands, skews (time differences) occur. In this case, regardless of which channel is a channel which is first activated (a channel which is first used to output stripped data blocks and is determined depends on an LBA designated by the host), the synchronization processing unit 142 can receive all of the commands.

The reason why the synchronization processing unit 142 performs the process of examining whether any command has been input from each channel, in a predetermined order of channels, and reexamining whether any command has been input from each channel is that it is not clear which channel has been first used to input the commands. By the way, this process is not necessarily needed. In a case where it is only needed to examine whether any command has been input from each channel, in a predetermined order of channels, once, when Flgi (wherein "i" is a number specifying Channel i which is examined) is "0", the synchronization processing unit examines whether Channel i is active or not. If Channel i is active, the synchronization processing unit performs the process of acquiring an LBA and an LBN of a command which is being input through Channel i and setting the flag Flgi to "1", only once.

In the reassembling process of STEP S22, the synchronization processing unit 142 extracts the earliest (smallest) LBA from the LBAs included in the acquired commands for the plurality of series, and reassembles the LBA (HLBA) input from the host 2, using the extracted LBA. This reassembled LBA will be referred to as the LBA of the reassembled command. Also the synchronization processing unit sums up the acquired LBNs, thereby reassembling the LBN input from the host 2, and this LBN will be referred to as the LBN of the reassembled command. Subsequently, in STEP S23, the synchronization processing unit 142 outputs the reassembled command to the storage system 17.

Next, in STEP S24, the synchronization processing unit 142 reserves a storage area having a predetermined size (for example, the data length input through the first interface unit 12 (a data length corresponding to the LBN of the reassembled command)), as an area for storing the data, in the storage unit 15. However, in a case where a storage area is already reserved, STEP S24 is not performed. Alternatively, the synchronization processing unit 142 may instruct the controller unit 171 of the storage system 17 to reserve an area for storing the data, thereby reserving an area.

Subsequently, in STEP S25, the synchronization processing unit 142 examines whether the input command is a data write command or not. In a case where the input command is a command for storing data ("Yes" in STEP S25), in STEP S26, the synchronization processing unit 142 outputs information specifying the corresponding storage area (such as the address of the head of the storage area) to the DMA processing unit 143 of every active channel, thereby instructing the DMA processing unit 143 to store the data in the storage unit 15 (DMA write instruction). Next, in STEP S27, the synchronization processing unit 142 waits for the write data to be stored in the storage unit 15 under control the DMA processing units 143.

Meanwhile, in STEP S27, if preparation of all the data is completed, in STEP S28, the synchronization processing unit 142 outputs a write request to the storage system 17.

Further, at a predetermined time point after STEP S27, the synchronization processing unit 142 outputs a request for finishing processing related to each channel, to the first control unit 11.

Meanwhile, in a case where it is determined in STEP S25 that the input command is a data read command ("No" in STEP S25), in STEP S30, the synchronization processing unit 142 waits for the storage system 17 to store the data in the storage area reserved in the storage unit 15, in response to the command output in STEP S23.

Then, if all the data is stored in the storage unit 15, in STEP S31, the synchronization processing unit 142 instructs the DMA processing units 143 to output the data from the storage unit 15 through the individual channels of the second interface unit 13 (DMA read instruction).

If the DMA processing units 143 receive the DMA write instruction or the DMA read instruction from the synchronization processing unit 142, they operate. Specifically, in a case of receiving the DMA write instruction, the DMA processing units 143 of the individual channels operate, whereby the data blocks are rearranged, serialized, and integrated, and then are written as a series of data in the storage unit 15. Meanwhile, in a case of receiving the DMA read instruction, the DMA processing units 143 of the individual channels read the data from the storage unit 15. Specifically, in the case of receiving the DMA write instruction, the DMA processing units 143 write the data blocks in the storage area specified by the information input from the synthetic image generating unit 47, as follows.

For ease of explanation, the following example will be described on the assumption that the LBA which is input from the host is a multiple of (B×N) (wherein "N" is the number of channels, and "B" is the size of a data block), and the LBN also is a multiple of (B×N). However, actually, the LBA and LBN which are input from the host are not limited to multiples of (B×N), and thus fraction processing is performed. This fraction processing is known, and thus will not be described in detail here.

If the DMA processing unit 143 receives the DMA write instruction, the DMA processing unit 143 writes the i-th one (wherein "i" is an integer of 1 or greater) of data blocks received by the receiving unit 141 through the first channel (the channel having received the first data block, that is, the channel having first received a data block which should be written in the earliest (smallest) LBA), in an area from an address (A0 N×(i−1)×B) to an address (A0+N×(i−1)×B+(B−1)). Here, "A0" is the address of the head of the storage area reserved by the synchronization processing unit 142. Also, "N" is the number of channels, and "B" is the size of a data block. Also, in the present embodiment, data blocks which are written or read in response to the individual commands received by the receiving unit 141 have the same size (therefore, the LBNs which are included in the individual commands have the same value).

Also, the DMA processing units 143 write the i-th one (wherein "i" is an integer of 1 or greater) data blocks received by the receiving unit 141 through the j-th channel (wherein "j" is an integer between 1 and N), in an area from an address (A0+N×(i−1)×B+(j−1)×B) to an address (A0+N×(i−1)×B+j×B−1). Here, "A0" is the address of the head of the storage area reserved by the synchronization processing unit 142.

For example, in a case where "N" is 2, while the zeroth, second, fourth, and sixth data blocks from the head are input through Channel 0 (CH0) of the second interface unit 13, and the first, third, fifth, and seventh data blocks from the head are input through Channel 1 (CH1) of the second interface unit 13, by operations of the DMA processing units 143, the zeroth to seventh data blocks are arranged as a series of data and the arranged data is stored from the head of the area reserved in the storage unit 15 by the synchronization processing unit 142.

Meanwhile, if receiving the DMA read instruction, the DMA processing units 143 divide the data stored in the storage unit 15 by the storage system 17, in units of a predetermined data block size (the size of a data block which should be read in response to each command output from the first control unit 11 through each channel), thereby obtaining data blocks, and transmit the data blocks sequentially from the head through the corresponding channel.

Specifically, the DMA processing units 143 determine a channel of the second interface unit 13 to be used to output the first data block, based on the LBA (HLBA) reassembled by the synchronization processing unit 142. This determination is performed in the same manner as that in the first control unit 11. In this example (the example in which N is 2), in a case where the quotient obtained by dividing the HLBA by "8" is an even number, Channel 0 (CH0) is determined as a channel to be used to output the first data block; whereas in a case where the quotient obtained by dividing the HLBA by "8" is an odd number, Channel 1 (CH1) is determined as a channel to be used to output the first data block. On the assumption that the determined channel is Channel j0, the following description will be made.

When the address of the head of the storage area reserved in the storage unit 15 by the synchronization processing unit 142 is denoted by "A0", the DMA processing units 143 continuously outputs data stored in an area from (A0+N×

(i−1)×B+(j−1)×B) to (A0+N×(i−1)×B+j×B−1) (wherein "i" is an integer of 1 or greater), through the k-th channel CHk−1 which should transmit the j-th data block (wherein 1<j≤N). Here, "k" is (j0+j−1) mod N+1 (here, x mod y means the remainder after division of x by y).

In this way, a data block read in response to a command received through Channel 0 (CH0) of the second interface unit 13 is transmitted through CH0 of the second interface unit 13, and a data block read in response to a command received through Channel 1 (CH1) of the second interface unit 13 is transmitted through CH1 of the second interface unit 13. After transmitting all the data blocks, the output unit 144 requests the first control unit 11 to perform a finishing process.

OPERATIONS

Figure 5:
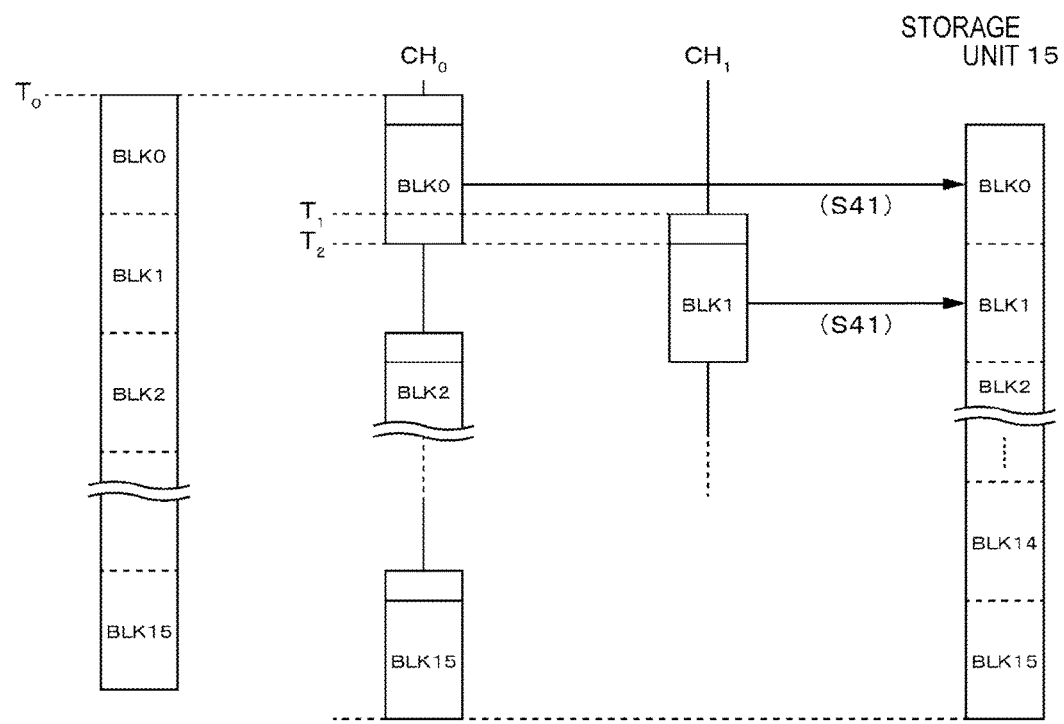
FIG. 5 is a timing flow chart illustrating an example of a writing operation of the storage control device according to the embodiment of the present disclosure.

The storage control device 1 of the present embodiment has the above-described configuration and operates as follows. Hereinafter, first, an operation of the storage control device 1 of the present embodiment during writing of data will be described with reference to the timing chart of FIG. 5.

The host 2 transmits data in units of a predetermined size (for example, 128 KB) or less, together with a write command including the address (HLBA) of a logical block which is a write destination in the logical volume, and a data length (LBN), through the first interface unit 12.

If the first control unit 11 receives the data from the host 2, it further divides the data into data blocks K1, K2, . . . of a predetermined size (for example, 4 KB). Also, based on the address (HLBA) of the logical block which is the write destination in the logical volume, the first control unit 11 determines a channel of the second interface unit 13 to be first used to transmit access instructions.

As an example, it is assumed that "N" is 2, that is, the second interface unit 13 has Channel 0 (CH0) and Channel 1 (CH1), and data of 64 KB has been received together with a command representing that the data should be written, from the host 2. In this case, the first control unit 11 divides the data in units of a predetermined block size (which is assumed to be 4 KB), thereby obtaining sixteen data blocks.

The first control unit 11 rearranges the obtained sixteen data blocks (referred to as BLK0 to BLK15), thereby obtaining two series of a first series (32 KB) including the data blocks BLK0, BLK2, BLK4, . . . , and BLK14 and a second series (32 KB) including the data blocks BLK1, BLK3 . . . , and BLK15. Further, the first control unit 11 generates an instruction of the first series (including the LBA of a head and a command for writing the data in an area of 32 KB from the LBA of the head) for writing the data blocks of the first series in a logical volume and a second series command (including the LBA of a head and a command for writing the data in an area of 32 KB from the LBA of the head) for writing the data blocks of the second series in the logical volume.

Also, the first control unit 11 determines a channel to be first used to output the data blocks, based on whether the quotient obtained by dividing the HLBA input from the host 2 by "8" is an odd number or even number (whether the remainder after division of the HLBA by 16 is 0 or not). In other words, in a case where the quotient obtained by dividing the HLBA by "8" is an even number, Channel 0 (CH0) is determined as a channel to be first used to output the data blocks; whereas in a case where the quotient obtained by dividing the HLBA by "8" is an odd number, Channel 1 (CH1) is determined as a channel to be first used to output the data blocks.

In this example, it is assumed that Channel 0 is determined as a channel to be first used to output the data blocks.

If the first control unit 11 receives a command designating an LBA and an LBN in the logical volume of RAID 0 and representing that data should be written, from the host 2, it divides the command received from the host 2, as access instructions of a plurality of series, to the N-number of channels of the second interface unit 13 (wherein "N" is an integer of 2 or greater). Here, each of the instructions of the plurality of series is output as one instruction with respect to the plurality of data blocks of the corresponding series, not with respect to each data block.

The second control unit 14 first receives the divided commands through CH0 and CH1 of the second interface unit 13. Then, the second control unit extracts the earlier (smallest) LBA from LBAs included in the individual commands for two series, and reassembles the LBA (HLBA) input from the host 2, using the extracted LBA. The reassembled LBA will be referred to as the LBA of the reassembled command. Subsequently, the second control unit 14 outputs a data write command including the LBA and the LBN obtained by reassembling, to the storage system 17.

The synchronization processing unit 142 instructs the controller unit 171 of the storage system 17 to reserve an area for storing the data, in the storage unit 15, thereby making the controller unit 171 reserve a storage area of a predetermined size (for example, the data length input through the first interface unit 12 (the LBN of the reassembled command)) in the storage unit 15.

Subsequently, the synchronization processing unit 142 outputs a command (a DMA write instruction) for storing the data in the storage area reserved in the storage unit 15, to the DMA processing units 143 of all active channels. Thereafter, the synchronization processing unit 142 waits for the write data to be written on the storage unit 15 under control of the DMA processing units 143.

The second control unit 14 starts to operate as the DMA processing units (start of DMA processing), and stores the data blocks having alternately input through CH0 and CH1 and having been input, in the storage unit 15 (STEP S41). Therefore, in the storage unit 15, the data blocks BLK0, BLK1, BLK2, . . . are sequentially and continuously stored (that is, the data transmitted by the host 2 is stored).

In this example, after start of DMA processing, the first control unit 11 prepares to transmit some data through CH0 (a timing T0), and when it is prepared to do that, the first control unit 11 transmits the corresponding data block BLK0. While the data block BLK0 is being transmitted through CH0, the first control unit 11 prepares to transmit some data through CH1 (a timing T1). Then, at the timing (T2) when transmission of the data block BLK0 through CH0 is completed, the first control unit 11 starts to transmit the next data block BLK1 through CH1.

Thereafter, the first control unit 11 transmits the data block BLK2 through CH0, and then transmits the data block BLK3 through CH1. In this way, the first control unit 11 transmits the data blocks in two series while alternately using CH0 and CH1.

Also, in a case where Channel 1 is determined as a channel to be first used to output the data blocks, at the timing T0, the first control unit 11 prepares to output some data through CH1. Then, when it is prepared, the first control unit 11 transmits the corresponding data block BLK0 through CH1. While the data block BLK0 is being transmitted through CH1, the first control unit 11 prepares to transmit the next data through CH0 (the timing T1). Then, at the timing (T2) when transmission of the data block BLK0 through CH1 is completed, the first control unit 11 starts to transmit the data block BLK1 through CH0.

Thereafter, the first control unit 11 transmits the data block BLK2 through CH1, and then transmits the data block BLK3 through CH0. In this way, the first control unit 11 transmits the data blocks in two series while alternately using CH0 and CH1.

If certain amount of the data transmitted by the host 2 is stored in the storage unit 15, according to the previously transmitted command, the controller unit 171 of the storage system 17 reads the data from the storage unit 15, and writes the data in the disk drives 172 which form RAID.

Also, at a predetermined timing after all of the data transmitted by the host 2 is stored in the storage unit 15, the second control unit 14 outputs a request for finishing processing, to the first control unit 11 through each channel. If the first control unit 11 receives the request for finishing processing, it finishes processing by closing each channel. In response to closing of the channels, the second control unit 14 finishes processing.

Now, an operation of the storage control device 1 of the present embodiment during reading of data will be described. The host 2 outputs a read command including the local block address (HLBA) of the logical volume where data which should be read is retained, and the length of the data (LBN), through the first interface unit 12.

If the first control unit 11 receives the command from the host 2, it divides logical blocks (for example, logical blocks of 64 KB) in the logical volume specified by the logical block address (HLBA) and the data length (LBN), into data blocks of a predetermined block size (for example, 4 KB), and rearranges the obtained data blocks in N-number of series (here, two series).

Specifically, in the above-described case, the first control unit rearranges the data blocks (the sixteen data blocks BLK0 to BLK15) of 4 KB in the logical volume, in two series, thereby obtaining the first series (32 KB) including the data blocks BLK0, BLK2, BLK4, . . . , and BLK14 and the second series (32 KB) including the data blocks BLK1, BLK3, . . . , and BLK15. Further, the first control unit 11 generates an instruction of the first series (including a command for reading the data from an area of 32 KB from the LBA of the head) for reading the data blocks of the first series from the logical volume, and an instruction of the second series (including a command for reading the data from an area of 32 KB from the LBA of the head) for reading the data blocks of the second series from the logical volume.

Based on the LBA (HLBA) of the head of the logical volume which is the read source (storage system 17) received from the host 2, the first control unit 11 determines a channel of the second interface unit 13 to be first used to transmit access instructions. Here, for example, it is assumed that two channels (the number "N" of channels is 2) are used from Channel 0 (CH0) to transmit the access instructions.

In the case where the number "N" of channels is 2, the plurality of access instructions (the instruction of the first series and the instruction of the second series) is generated such that the data blocks which are read from the storage system 17 are handled as follow.

In other words, the first control unit 11 receives the first data block (the data block BLK0 which should be written in Block 0) of the data blocks of the first series read in response to the instruction of the first series, through CH0 which is the first channel.

Then, the first control unit 11 receives the first data block (the data block BLK1 which should be written in Block 1) of the data blocks of the second series read in response to the instruction of the second series, through the next channel (in this case, since the first control unit 11 receives the first data block through CH0, the next channel is CH1). Thereafter, the first control unit 11 receives the data blocks BLK2 to BLK15 while using CH0 and CH1 alternately.

Therefore, the instruction of the first series for reading the data blocks BLK0, BLK2, BLK4, . . . , and BLK14 of the first series which should be stored in Blocks 0, 2, 4, . . . , 14 is output through CH0 of the second interface unit 13, and the instruction of the second series for reading the data blocks BLK1, BLK3, . . . , and BLK15 which should be stored in Blocks 1, 3, 5, . . . , 15 is output through CH1 of the second interface unit 13. Here, each of the instructions of the first and second series is output as one instruction with respect to the plurality of data blocks of the corresponding series, not with respect to each data block.

As described above, if the first control unit 11 receives the command including the LBA in the logical volume of RAID 0 and the LBN and representing that the data designated by the LBA and the LBN should be read, from the host 2, the first control unit 11 divides the command received from the host 2, and outputs the divided command, as access instructions of a plurality of series, to the N-number of channels of the second interface unit 13 (wherein "N" is an integer of 2 or greater).

Also, if the data of the blocks (the data blocks) are read from the storage system 17 and are input through CH0 and CH1 of the second interface unit 13, the first control unit 11 arranges the data blocks sequentially (here, alternately) and continuously, and then outputs the data blocks to the host 2.

This processing of the first control unit 11 is the same as processing widely known as processing of a RAID 0 controller. Therefore, here, a more detailed description thereof will be omitted.

The second control unit 14 receives the divided commands (access instructions of two series) through the channels CH0 and CH1 of the second interface unit 13, respectively. Then, the second control unit 14 extracts the earliest (smallest) LBA from the LBAs included in the commands acquired as access instructions of two series, and reassembles the LBA (HLBA) input from the host 2, using the extracted LBA. This reassembled LBA will be referred to as the LBA of the reassembled command.

The second control unit 14 outputs the read command including the reassembled LBA and the reassembled LBN, to the storage system 17. Also, the second control unit 14 instructs the controller unit 171 of the storage system 17 to reserve an area for storing the data, thereby making the controller unit 171 reserves an area for storing the read data, in the storage unit 15. Also, this process of reserving an area may be performed by the second control unit 14.

In response to the command received from the second control unit 14, the storage system 17 reads the data specified by the LBA and the LBN designated, from the disk drives 172, and stores the read data in the area reserved in the storage unit 15.

If certain amount of the data read by the storage system 17 is stored in the storage unit 15, the second control unit 14 divides the corresponding data into data blocks of the predetermined size, and transmits each of the data blocks through a corresponding channel. In this example, since the read instruction related to the data blocks BLK0, BLK2, . . . has been received through CH0, and the read instruction related to the data blocks BLK1, BLK3, . . . has been received through CH1, the second control unit 14 transmits the data blocks BLK0, BLK2, . . . through CH0, and transmits the data blocks BLK1, BLK3, . . . through CH1. A channel to be used to output each data block is determined based on the LBA (the same LBA as that output from the host 2, that is, the HLBA) reassembled by the second control unit 14 by the same process as the process which the first control unit 11 performs to determine a channel to be first used to output the data blocks.

If all the data blocks read by the read command are transmitted to the first control unit 11, the second control unit 14 outputs a request for finishing processing, to the first control unit 11 through each channel. If the first control unit 11 receives the request for finishing processing, it finishes processing by closing each channel. In response to closing of the channels, the second control unit 14 finishes processing.

In the present embodiment, since control is performed such that the request for finishing processing is issued at the predetermined timing after transmission of the data (data transmission between the first control unit 11 and the storage system 17) finishes as described above, there are the following effects. The request for finishing processing may be issued separately with respect to the individual channels by controlling the individual channels of the second interface unit 13 by individual processes, not by a single process, unlike control in the present embodiment, and accessing one RAID system by each process.

In this case, if the first control unit 11 independently performs the finishing process on the individual channels by the respective processes, when the first control unit 11 completes transmission of the first data block through CH0, a process of controlling CH0 of the second control unit 14 issues the request for the finishing process through CH0; however, until the data of CH1 is read, the first control unit 11 cannot finish processing, and the CH0 control process of the second control unit 14 also cannot finish processing and thus transitions to a stand-by state. For this reason, a process of controlling CH1 stands by for processing, in a state it is impossible to access to the RAID system and it is impossible to read data blocks which should be transmitted through CH1. In this state, all the processes become the stand-by state for processing. Therefore, the processing becomes a deadlock state.

Meanwhile, like in the present embodiment, if the request for the finishing process is issued after processing in all channels is completed by the single process, even though the first control unit 11 waits for the request for the finishing process to be received from every channel, and performs the process of finishing processing on the channels at the same time, deadlock does not occur.

Also, according to the present embodiment, since the storage system 17 is a single device including a single logical volume, the portability of the storage system 17 is improved. In contrast with this, in a case of connecting a plurality of RAIDs, like in the related art, since a device (like a device disclosed in US2014/0351509A) for reassembling a plurality of logical volumes composed of a plurality of devices into a single logical volume is required, the portability is low.

Also, according to the present embodiment, since any storage control device can be used as the storage system 17, it is possible to improve extensibility of the device, for example, to secure redundancy while maintaining access speed and suppressing an increase in the circuit scale.

MODIFICATIONS

Figure 6:
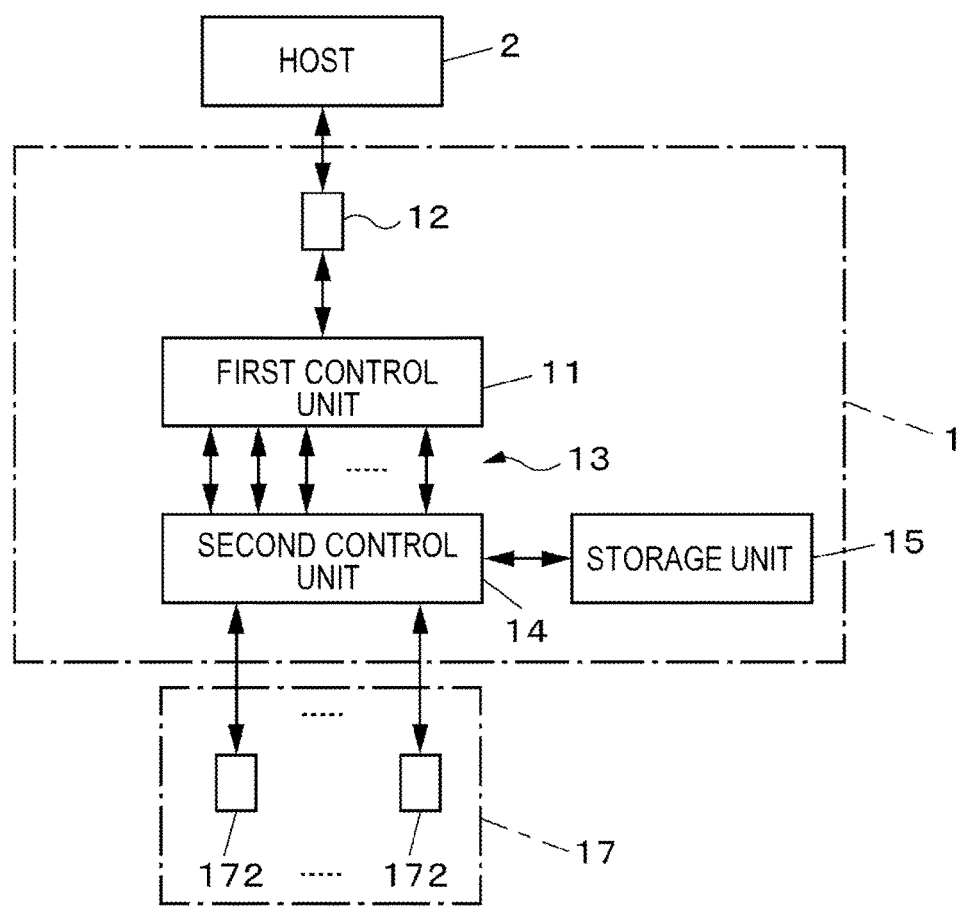
FIG. 6 is a block diagram illustrating another configuration example of the storage control device according to the embodiment of the present disclosure.

In the above description, the second control unit 14 may be configured to function as the controller unit 171 of the storage system 17. In this case, as illustrated in FIG. 6, the third interface unit 16 becomes unnecessary, and the second control unit 14 performs an operation of writing data in the disk drives 172 or reading data from the disk drives 172.

As described above, the storage control device 1 is connected to the controller unit 171 configured to perform writing of data in the storage (the disk drives 172) or reading of data from the storage, according to an instruction for access to the storage, and receives second access instructions of a plurality of series generated based on a first access instruction for instructing writing of data in the storage or reading of data from the storage, through a plurality of channels, and reassembles the first access instruction based on the received second access instructions, and outputs the reassembled first access instruction to the controller unit 171.

That is, after the access instruction input from the host is reassembled based on the divided access instructions of the plurality of series, processing is performed. Therefore, it is possible to suppress an increase in the scale of the device while maintaining the operation speed.

The invention claimed is:
1. A storage control device comprising:
processing circuitry configured to:
receive second access instructions of a plurality of series generated based on a first access instruction for instructing writing of data in a first storage or reading of data from the first storage, through a plurality of channels, the storage control device being connected to a controller configured to perform writing of data in the first storage or reading of data from the first storage according to an instruction for accessing the first storage;
reassemble the first access instruction based on the second access instructions of the plurality of series received by the processing circuitry; and
output the first access instruction reassembled by the processing circuitry to the controller, wherein
the first storage includes a plurality of disk drives which form RAID, and wherein
the controller is a RAID controller configured to control the first storage including the plurality of disk drives which form the RAID, the storage control device further comprising:
a second storage configured to store therein write data, wherein
the processing circuitry is further configured to reassemble write data included in the first access instruction based on write data included in the second access instructions of the plurality of series and store the reassembled write data in the second storage when reassembling the first access instruction from the second access instructions of the plurality of series which are write instructions, and wherein
the controller is configured to read data from the second storage and write the data in the first storage.

2. The storage control device according to claim 1,
wherein the processing circuitry is configured to arrange the second access instructions of the plurality of series in a predetermined order to reassemble the first access instruction.

3. The storage control device according to claim 1, wherein the processing circuitry is further configured to receive the first access instruction from a host and generate the second access instructions of the plurality of series.

4. The storage control device according to claim 1,
wherein the processing circuitry is further configured to issue an instruction for finishing processing related to the second access instructions, to the plurality of channels at a predetermined time point after the first access instruction is reassembled.

5. The storage control device according to claim 3,
wherein the first storage includes a plurality of disk drives which form RAID, and
wherein the controller is a RAID controller configured to control the first storage including the plurality of disk drives which form the RAID.

6. The storage control device according to claim 5,
wherein the processing circuitry is further configured to issue an instruction for finishing processing related to the second access instructions, to the plurality of channels at a predetermined time point after the first access instruction is reassembled.

7. The storage control device according to claim 5, further comprising:
a second storage configured to store therein write data,
wherein the processing circuitry is further configured to reassemble write data included in the first access instruction based on write data included in the second access instructions and store the reassembled write data in the second storage when reassembling the first access instruction from the second access instructions of the plurality of series which are write instructions, and
wherein the controller is configured to read data from the second storage and write the data in the first storage.

8. The storage control device according to claim 7,
wherein the processing circuitry is further configured to issue an instruction for finishing processing related to the second access instructions, to the plurality of channels at a predetermined time point after the first access instruction is reassembled.

9. The storage control device according to claim 3, further comprising:
a second storage configured to store therein write data,
wherein the processing circuitry is further configured to reassemble write data included in the first access instruction based on write data included in the second access instructions of the plurality of series and store the reassembled write data in the second storage when reassembling the first access instruction from the second access instructions of the plurality of series which are write instructions, and
wherein the controller is configured to read data from the second storage and write the data in the first storage.

10. The storage control device according to claim 9,
wherein the processing circuitry is further configured to issue an instruction for finishing processing related to the second access instructions, to the plurality of channels at a predetermined time point after the first access instruction is reassembled.

11. A non-transitory computer-readable storage medium storing execution instructions, which when executed by a processor of a storage control device configured to control a storage, cause the processor to:
receive second access instructions of a plurality of series generated based on a first access instruction for instructing writing of data in a first storage or reading of data from the first storage, through a plurality of channels, the storage control device being connected to a controller configured to perform writing of data in the first storage or reading of data from the first storage according to an instruction for accessing the storage;
reassemble the first access instruction based on the received second access instructions of the plurality of series; and
output the reassembled first access instruction to the controller of the storage, wherein
the first storage includes a plurality of disk drives which form RAID, and wherein
the controller is a RAID controller configured to control the first storage including the plurality of disk drives which form the RAID, the storage control device further comprising:
a second storage configured to store therein write data, wherein
the processor reassembles write data included in the first access instruction based on write data included in the second access instructions of the plurality of series and stores the reassembled write data in the second storage when reassembling the first access instruction from the second access instructions of the plurality of series which are write instructions, and wherein
the controller is configured to read data from the second storage and write the data in the first storage.

12. A storage control device comprising:
a first interface which is connected to a host and is configured to receive from the host a first access instruction for instructing writing of data in a first storage or reading of data from the first storage;
first control circuitry which is connected to the first interface;
second control circuitry; and
a second interface which includes a plurality of channels connecting the first control circuitry and the second control circuitry,
wherein the first control circuitry includes:
a first memory configured to store therein execution instructions; and
first processing circuitry, wherein
according to the execution instructions stored in the first memory, the first processing circuitry is configured to
receive the first access instruction from the host through the first interface;
divide the received first access instruction to generate second access instructions of a plurality of series; and
transmit the generated second access instructions of the plurality of series, to the second control circuitry through the plurality of channels of the second interface, wherein the second control circuitry includes:
a second memory configured to store therein execution instructions; and
second processing circuitry, wherein
according to the execution instructions stored in the second memory, the second processing circuitry is configured to
receive the second access instructions of the plurality of series from the first control circuitry through the plurality of channels of the second interface;
reassemble the first access instruction based on the received second access instructions of the plurality of series; and output the reassembled first access instruction to a controller of the first storage, the storage control device, the storage control device further comprising:
a second storage configured to store therein write data, wherein,
according to the execution instructions stored in the second memory, the second processing circuitry is configured to
reassemble write data included in the first access instruction based on write data included in the second access instructions of the plurality of series and store the reassembled write data in the second storage when reassembling the first access instruction from the second access instructions of the plurality of series which are write instructions, and wherein
the controller is configured to read data from the second storage and write the data in the first storage.

13. The storage control device according to claim 12, wherein the second control circuitry is configured to arrange the second access instructions of the plurality of series in a predetermined order to reassemble the first access instruction.

14. The storage control device according to claim 12, wherein the first storage includes a plurality of disk drives which form RAID, and
wherein the controller is a RAID controller configured to control the first storage including the plurality of disk drives which form the RAID.

15. The storage control device according to claim 12, wherein according to execution instructions stored in the second memory, the second processing circuitry is configured to:
issue an instruction for finishing processing related to the second access instructions, to the plurality of channels at a predetermined time point after the first access instruction is reassembled.

16. The storage control device according to claim 12, wherein a communication speed of the first interface is higher than a communication speed of each channel of the second interface.

* * * * *